United States Patent
Kawai et al.

(10) Patent No.: US 8,141,539 B2
(45) Date of Patent: Mar. 27, 2012

(54) CONTROLLER AND CONTROL METHOD FOR INTERNAL COMBUSTION ENGINE

(75) Inventors: Katsuyuki Kawai, Toyota (JP); Hideaki Kawai, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 208 days.

(21) Appl. No.: 12/451,844

(22) PCT Filed: Jul. 7, 2008

(86) PCT No.: PCT/JP2008/062646
§ 371 (c)(1),
(2), (4) Date: Dec. 3, 2009

(87) PCT Pub. No.: WO2009/008527
PCT Pub. Date: Jan. 15, 2009

(65) Prior Publication Data
US 2010/0116248 A1    May 13, 2010

(30) Foreign Application Priority Data

Jul. 10, 2007    (JP) ................................. 2007-180689

(51) Int. Cl.
*F02P 5/15* (2006.01)
*F02M 35/10* (2006.01)
*G06F 19/00* (2006.01)

(52) U.S. Cl. ............. 123/406.45; 123/184.55; 123/432; 123/442; 123/406.23; 701/103; 701/110

(58) Field of Classification Search .......... 701/101–103, 701/113, 114; 123/184.55, 184.56, 188.14, 123/306, 342, 350, 352, 403, 406.23–406.26, 123/406.45, 406.58, 406.59, 308, 432, 442, 123/361, 399
See application file for complete search history.

(56) References Cited

U.S. PATENT DOCUMENTS

| | | | | |
|---|---|---|---|---|
| 5,251,138 | A | * | 10/1993 | Katayama ....................... 701/95 |
| 5,337,240 | A | * | 8/1994 | Nakagawa et al. ............. 701/99 |
| 5,727,528 | A | | 3/1998 | Hori et al. |
| 6,058,349 | A | * | 5/2000 | Kikori et al. .................. 701/114 |
| 6,276,333 | B1 | | 8/2001 | Kazama et al. |
| 6,385,529 | B1 | * | 5/2002 | Minowa et al. ................. 701/96 |

(Continued)

FOREIGN PATENT DOCUMENTS

EP    1 020 625 A2    7/2000

(Continued)

OTHER PUBLICATIONS

Japanese Office Action issued in Japanese Application No. 2007-180689; mailed on May 18, 2010 (with English-language translation).

(Continued)

*Primary Examiner* — Willis Wolfe, Jr.
*Assistant Examiner* — Johnny Hoang
(74) *Attorney, Agent, or Firm* — Oliff & Berridge, PLC (57) ABSTRACT

An ECU controls an adjusting mechanism adjusting an output of an engine, such as a throttle valve, a swirl control valve, an ignition plug, an intake valve, and an ACIS (Acoustic Control Induction System) changing the length of an intake manifold, in accordance with a ratio between a maximum value KL(MAX) of load factor and the load factor required of the engine by the driver and by the system mounted on the vehicle at current engine speed NE.

6 Claims, 11 Drawing Sheets

U.S. PATENT DOCUMENTS

| | | | |
|---|---|---|---|
| 6,453,229 B1 * | 9/2002 | Ohkuma et al. | 701/109 |
| 6,704,641 B2 * | 3/2004 | Tashiro et al. | 701/110 |
| 7,373,238 B2 * | 5/2008 | Hakariya et al. | 701/103 |
| 7,740,559 B2 * | 6/2010 | Ayabe et al. | 477/102 |
| 2002/0095255 A1 * | 7/2002 | Minowa et al. | 701/96 |

FOREIGN PATENT DOCUMENTS

| | | |
|---|---|---|
| JP | A-11-236837 | 8/1999 |
| JP | A-2000-097073 | 4/2000 |
| JP | A-2002-089329 | 3/2002 |
| JP | A-2004-124743 | 4/2004 |

OTHER PUBLICATIONS

International Search Report issued in International Application No. PCT/JP2008/062646 on Oct. 27, 2008.

International Preliminary Report on Patentability issued in International Application No. PCT/JP2008/062646 on Sep. 16, 2009.

* cited by examiner

CONTROLLER AND CONTROL METHOD FOR INTERNAL COMBUSTION ENGINE

TECHNICAL FIELD

The present invention relates to a controller and a control method for an internal combustion engine and, more specifically, to a technique for controlling an adjustment mechanism that adjusts an output of the internal combustion engine.

BACKGROUND ART

Conventionally, in an internal combustion engine, an output is adjusted by adjusting quantity of intake air (amount of air filled in a cylinder), ignition timing and the like. By way of example, the output of internal combustion engine is adjusted by means of a throttle valve, a swirl control valve, an ignition plug, an intake valve, an exhaust valve, an ACIS (Acoustic Control Induction System) changing the length of an intake manifold and the like (hereinafter these mechanisms will also be referred to as adjusting mechanisms). The adjusting mechanism is controlled in accordance with an open position of an accelerator pedal (hereinafter also referred to as the accelerator position), which is operated by the driver. For instance, the output is regulated to be larger when the accelerator position is larger.

The driver operates the accelerator pedal to increase or decrease the output of internal combustion engine. Therefore, it is possible to convert the accelerator position to a parameter representing the output of the internal combustion engine (such as an output torque or load), and to obtain the output matching the request of the driver by controlling the adjustment mechanism in accordance with the parameter.

Japanese Patent Laying-Open No. 11-236837 discloses a control device for an engine, in which a target load is set in accordance with the state of operation of the engine, and a value of control parameter related to engine output is determined based on the target load. The control device includes an accelerator operation sensor detecting an amount of accelerator operation or a corresponding value, a speed sensor detecting engine speed, an intake air density state sensor detecting density state of intake air, and a target load setting unit. The target load setting unit calculates a virtual volume efficiency in accordance with outputs of the accelerator operation sensor and the speed sensor based on a preset correspondence between the accelerator operation amount and the engine speed, calculates a virtual filling efficiency as a filling efficiency that matches the requested engine torque when standard operating conditions for maintaining prescribed air-fuel ratio is assumed, by correcting the virtual volume efficiency in consideration of intake air density state, and sets a value corresponding to the virtual filling efficiency as the target load.

In the control device described in the laid-open application, the virtual filling efficiency matching the requested engine torque assuming the standard operating conditions is calculated, and the corresponding value is calculated as the target load. Particularly, from the pre-set correspondence, the virtual volume efficiency is calculated in accordance with the accelerator operation amount and the engine speed, which efficiency is corrected in consideration of intake air density state, whereby the virtual filling efficiency is calculated. Therefore, when the intake air density state varies because of variations in intake air temperature or atmospheric pressure, the target load is adjusted accordingly. Consequently, the value of control parameter determined based on the target load is appropriately adjusted in accordance with the intake air density state.

The output (load) of internal combustion engine changes in accordance with the change in throttle opening position, and the amount of change in the output becomes smaller when the throttle opening becomes larger. Therefore, in a range where the throttle opening position is large, the throttle opening position may vary significantly even when the target output value of internal combustion engine varies only slightly. Therefore, if the throttle valve is controlled in accordance with the target load calculated by the control device described in Japanese Patent Laying-Open No. 11-236837, the amount of change in throttle opening position could be significantly large. This may possibly leads to hunting of throttle valve. In an engine having a swirl control valve set to operate dependent on the throttle opening position, hunting of swirl control valve is also possible. In either case, output accuracy of the internal combustion engine would be degraded.

DISCLOSURE OF THE INVENTION

An object of the present invention is to provide a controller and a control method for an internal combustion engine that can control an output of internal combustion engine with high accuracy.

According to an aspect, the present invention provides a controller for an internal combustion engine, including an adjusting mechanism adjusting an output of the internal combustion engine and a control unit. The control unit calculates a target value of the output of internal combustion engine, detects an output shaft speed of the internal combustion engine, and controls the adjusting mechanism in accordance with a ratio between maximum output of the internal combustion engine and the target value, at the detected output shaft speed.

In this arrangement, the target output value of the internal combustion engine is calculated. Further, the output shaft speed is detected. In accordance with the ratio between the maximum output of the internal combustion engine and the target output value at the detected output shaft speed, the adjusting mechanism adjusting the output of internal combustion engine is controlled. The maximum output is uniquely determined with respect to the output shaft speed. Therefore, the ratio between the maximum output and the target value is in proportion to the target value. Therefore, if the target value varies by a small mount, the ratio between the maximum output and the target value varies by a small amount. On the contrary, if the target value varies by a large amount, the ratio between the maximum output and the target value varies by a large amount. The adjusting mechanism is controlled in accordance with the ratio having such a characteristic. Therefore, the function of adjusting mechanism can be stabilized. As a result, the output of internal combustion engine can be controlled with higher accuracy.

Preferably, the adjusting mechanism includes a first adjusting mechanism and a second adjusting mechanism. The control unit calculates a first target value of the output of the internal combustion engine, calculates a second target value by correcting the first target value, controls the first adjusting mechanism in accordance with a ratio between the maximum output and the first target value, and controls the second adjusting mechanism in accordance with a ratio between the maximum output and the second target value.

In this arrangement, the first and second adjusting mechanisms are provided. The first target value of the output of internal combustion engine, and the second target value as a correction of the first target value are calculated. In accordance with the ratio between the maximum output and the first target value, the first adjusting mechanism is controlled. In accordance with the ratio between the maximum output and the second target value, the second adjusting mechanism is controlled. Thus, it is possible to operate different adjusting mechanisms in accordance with the characteristic of the target value. By way of example, the throttle valve may be controlled such that it is opened/closed in accordance with the target value that varies moderately, and the ignition plug may be controlled so that the ignition timing is changed in accordance with the target value that changes quickly. As a result, it becomes possible to have the actual output of the internal combustion engine match the target value with high accuracy.

More preferably, the adjusting mechanism is a throttle valve. The control unit controls the throttle valve such that the valve opens/closes in accordance with the ratio between the maximum output and the target value.

By this arrangement, the operation of throttle valve can be stabilized.

More preferably, the adjusting mechanism is a swirl control valve. The control unit controls the swirl control valve such that the valve opens/closes in accordance with the ratio between the maximum output and the target value.

By this arrangement, the operation of swirl control valve can be stabilized.

More preferably, the adjusting mechanism is an ignition plug. The control unit controls the ignition plug such that ignition timing is changed in accordance with the ratio between the maximum output and the target value.

By this arrangement, the ignition timing of the ignition plug can be stabilized.

More preferably, the adjusting mechanism is at least one of an intake valve and an exhaust valve. The control unit controls at least one of the intake valve and the exhaust valve such that phase is changed in accordance with the ratio between the maximum output and the target value.

By this arrangement, the phase of at least one of the intake valve and the exhaust valve can be stabilized.

More preferably, the adjusting mechanism adjusts the output of the internal combustion engine by changing length of an intake manifold of the internal combustion engine. The control unit controls the adjusting mechanism such that the length of the intake manifold is changed in accordance with the ratio between the maximum output and the target value.

By this arrangement, the length of the intake manifold can be stabilized.

BEST MODES FOR CARRYING OUT THE INVENTION

Figure 1:
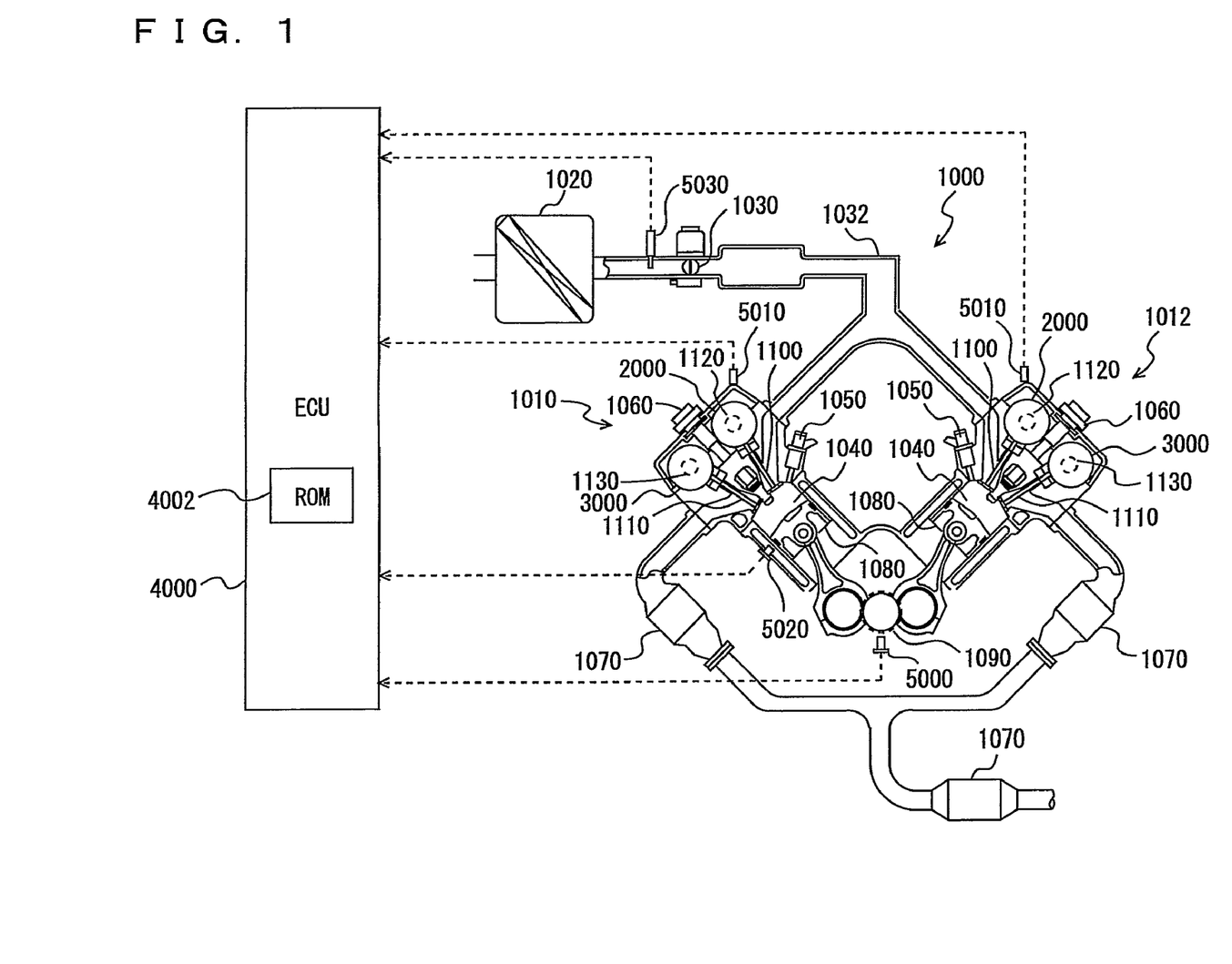
FIG. 1 is a schematic diagram showing an engine.

Referring to FIG. 1, an engine of a vehicle mounting the controller in accordance with an embodiment of the present invention will be described. The controller in accordance with the present embodiment is realized by an ECU (Electronic Control Unit) 4000 shown in FIG. 1, for example, executing a program stored in an ROM (Read Only Memory) 4002. ECU 4000 may be divided into a plurality of ECUs. Further, the program executed by ECU 4000 may be recorded on a recording medium such as a CD (Compact Disc) or a DVD (Digital Versatile Disc) and commercially distributed.

An engine 1000 is mounted as a driving source on the vehicle. Engine 1000 is a V-type 8-cylinder engine having an "A" bank 1010 and a "B" bank 1012 each including a group of four cylinders. Here, any engine other than the V8 engine may be used.

Into engine 1000, air is sucked from an air cleaner 1020. The quantity of sucked air is adjusted by a throttle valve 1030. Throttle valve 1030 is an electronic throttle valve driven by a motor.

The air is supplied through an intake manifold 1032 into a cylinder 1040. The air is mixed with fuel in cylinder 1040 (combustion chamber). Into cylinder 1040, the fuel is directly injected from an injector 1050. In other words, injection holes of injector 1050 are provided within cylinder 1040.

The fuel is injected in the intake stroke. The fuel injection timing is not limited to the intake stroke. Further, in the present embodiment, engine 1000 is described as a direct-injection engine having injection holes of injector 1050 that are disposed within cylinder 1040. However, in addition to direct-injection (in-cylinder) injector 1050, a port injector may be provided. Alternatively, only the port injector may be provided.

The air-fuel mixture in cylinder 1040 is ignited by a spark plug 1060 and burned. The air-fuel mixture after burned, namely exhaust gas, is cleaned by a three-way catalyst 1070 and thereafter discharged to the outside of the vehicle. The air-fuel mixture is burned to press down a piston 1080 and thereby rotates a crankshaft 1090.

At the top of cylinder 1040, an intake valve 1100 and an exhaust valve 1110 are provided. Intake valve 1100 is driven by an intake camshaft 1120. Exhaust valve 1110 is driven by an exhaust camshaft 1130. Intake camshaft 1120 and exhaust camshaft 1130 are coupled by such parts as a chain and gears to be rotated at the same rotational speed.

Further, at least one of the intake camshaft 1120 and exhaust camshaft 1130 is coupled to a crankshaft 1090 by means of a chain, a belt or the like. Intake camshaft 1120 and exhaust camshaft 1130 rotate at one-half the rotational speed of crankshaft 1090.

Intake valve 1100 has its phase (opening/closing timing) controlled by an intake VVT mechanism 2000 provided to intake camshaft 1120. Exhaust valve 1110 has its phase (opening/closing timing) controlled by an exhaust VVT mechanism 3000 provided to exhaust camshaft 1130.

In the present embodiment, intake camshaft 1120 and exhaust camshaft 1130 are rotated by the VVT mechanisms to control respective phases of intake valve 1100 and exhaust valve 1110. Here, the phase control method is not limited to the one described above.

Intake VVT mechanism 2000 and exhaust VVT mechanism 3000 are operated by electric motors. Intake VVT mechanism 2000 or exhaust VVT mechanism 3000 may be hydraulically operated. Further, known technique may be applied to the VVT mechanism and, therefore, detailed description thereof will not be given here. Further, the phase of only one of the intake valve 1100 and exhaust valve 1110 may be changed.

To ECU 4000, signals indicating the rotational speed and the crank angle of crankshaft 1090 are input from a crank angle sensor 5000. Further, to ECU 4000, signals indicating respective phases of intake camshaft 1120 and exhaust camshaft 1130 (phase: the camshaft position in the rotational direction) are input from a cam position sensor 5010.

Furthermore, to ECU 4000, a signal indicating the water temperature (coolant temperature) of engine 1000 from a coolant temperature sensor 5020 as well as a signal indicating the quantity of intake air (quantity of air taken or sucked into engine 1000) of engine 1000 from an airflow meter 5030 are input.

Based on these signals input from the sensors as well as a map and a program stored in a memory (not shown), ECU 4000 controls the throttle opening position, the ignition timing, the fuel injection timing, the quantity of injected fuel, the phase of intake valve 1100 and the phase of exhaust valve 1110 for example, so that engine 1000 is operated in a desired operating state.

Figure 2:
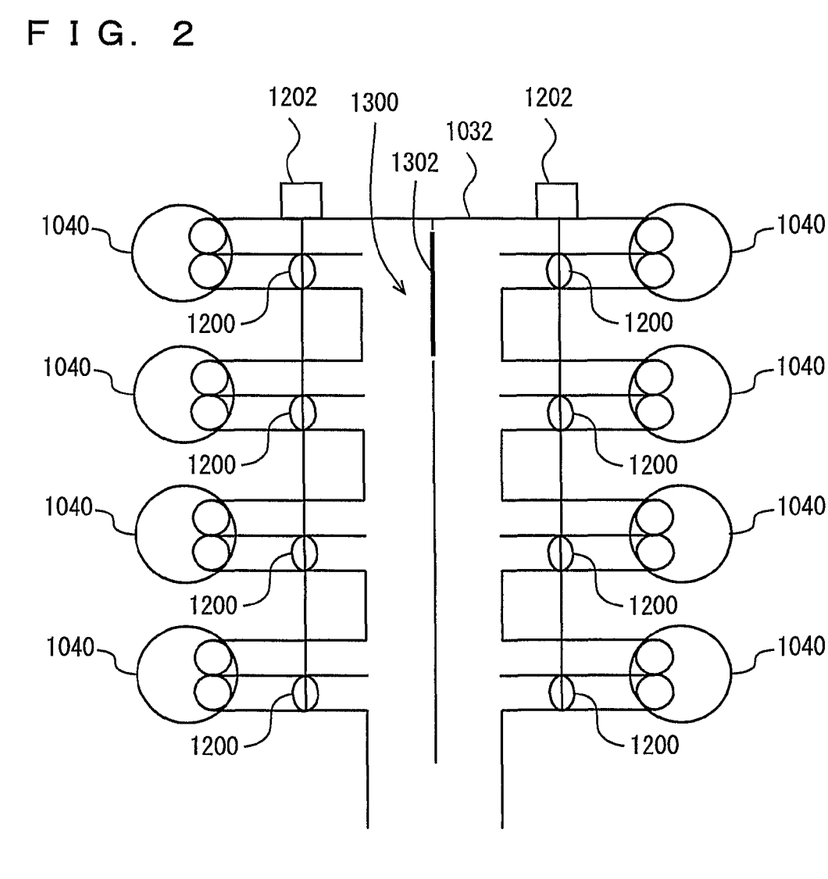
FIG. 2 shows the swirl control valve and the ACIS.

Referring to FIG. 2, engine 1000 will further be described. In engine 1000, a swirl control valve 1200 and an ACIS 1300 are provided.

Swirl control valve 1200 is provided at one of two intake ports connected to cylinder 1040. When swirl control valve 1200 is closed, flow rate of air passing through the other port becomes faster and, as a result, disturbed flow in the lateral direction in cylinder 1040 increases. This promotes atomization of fuel. Swirl control valve 1200 is opened/closed by a driving force of motor 1202.

Figure 3:
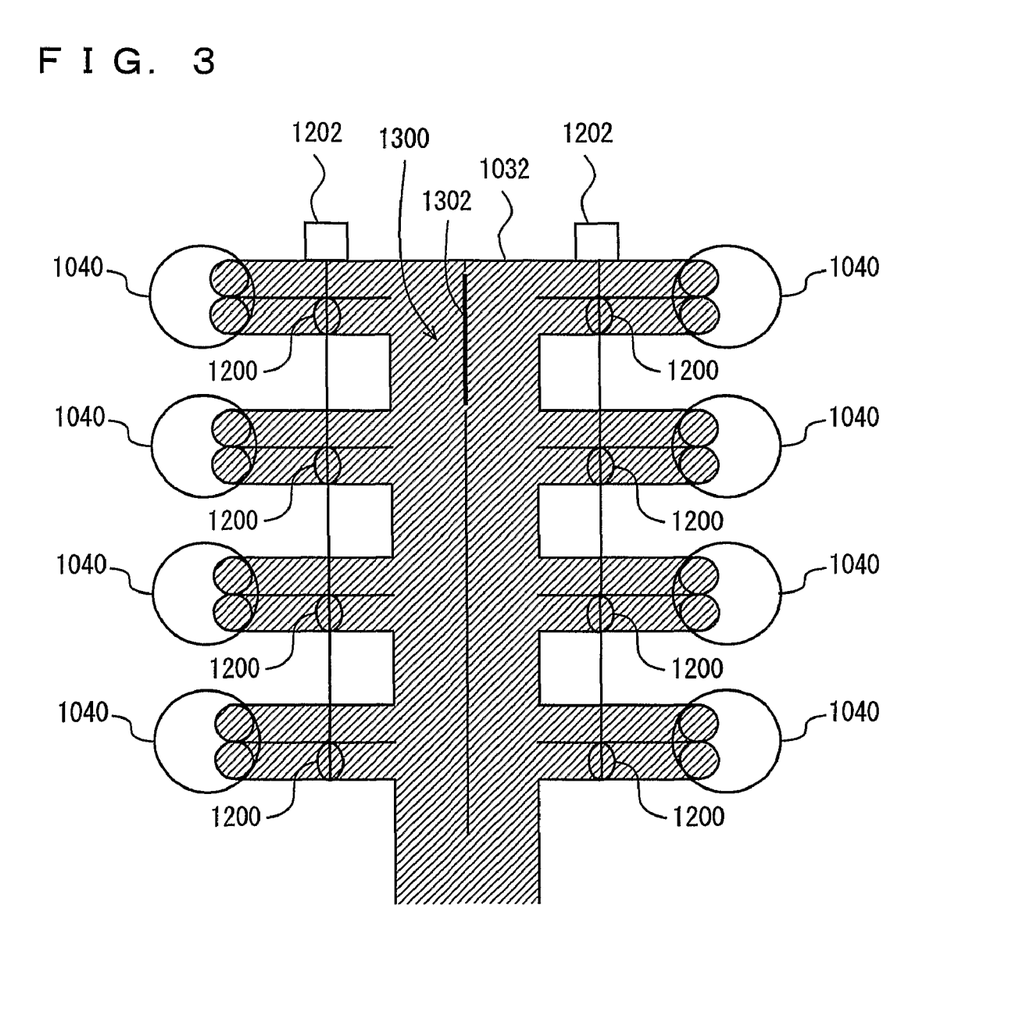
FIG. 3 shows the ACIS valve in a closed state.
Figure 4:
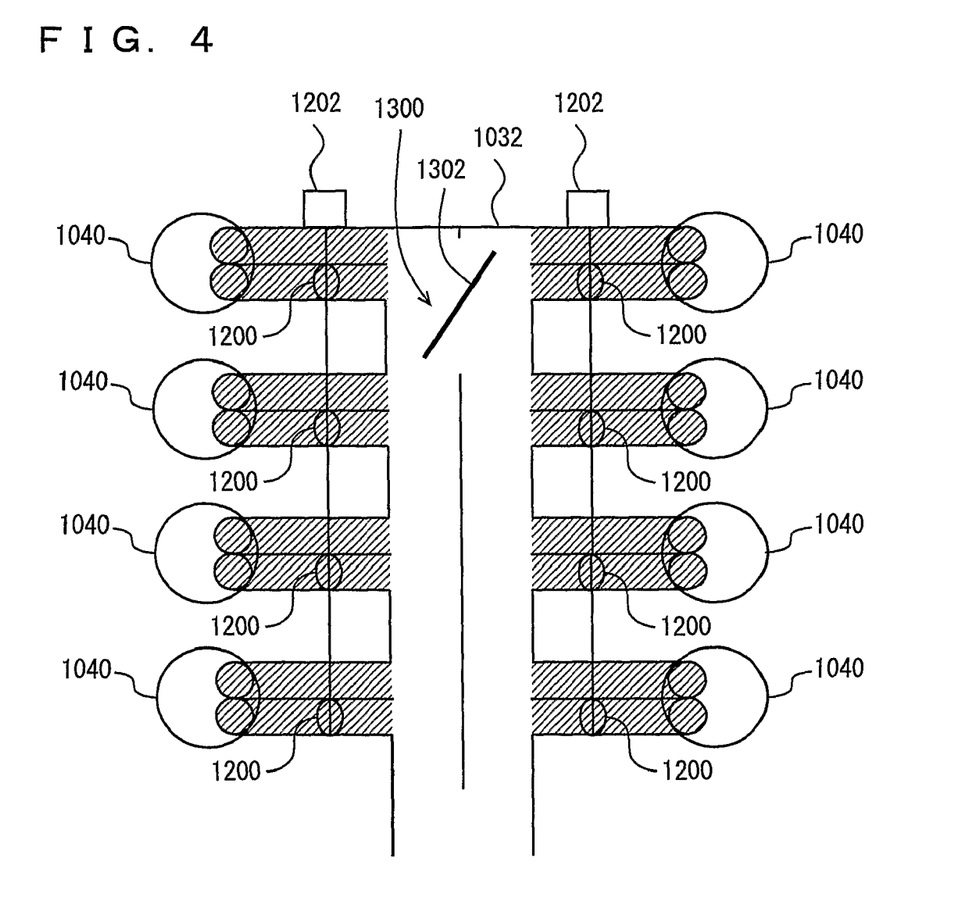
FIG. 4 shows the ACIS valve in an open state.

ACIS 1300 opens/closes an ACIS valve 1302, to switch the length of intake manifold 1032 in two stages. Specifically, the effective length of intake manifold 1032 is switched in two stages. When ACIS valve 1032 is closed, effective length of intake valve 1032 becomes longer as represented by hatched portion in FIG. 3. When ACIS valve 1302 is opened, the effective length of intake manifold 1032 becomes shorter, as shown by hatched portion in FIG. 4.

Figure 5:
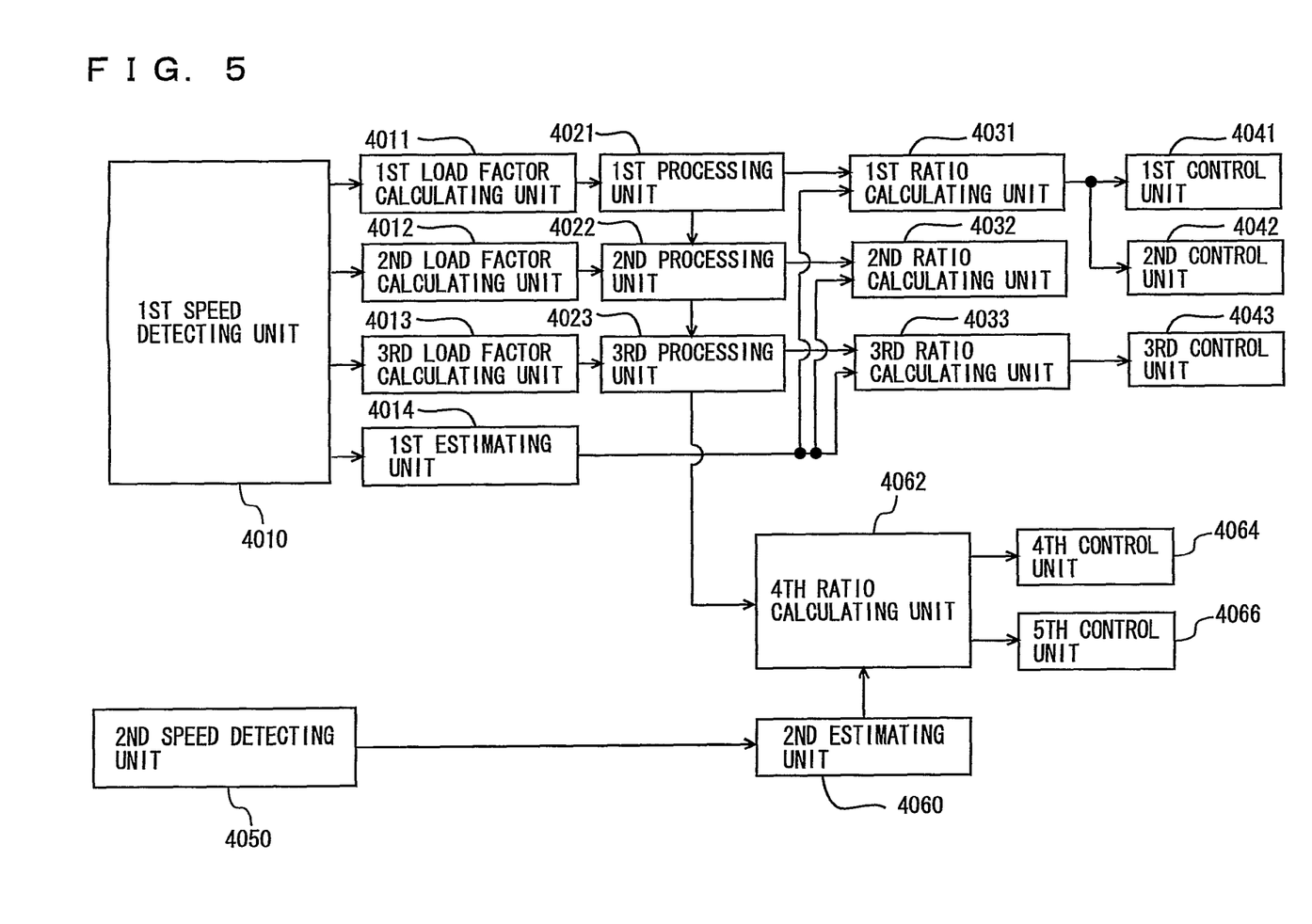
FIG. 5 is a functional block diagram of an ECU.

Referring to FIG. 5, the function of ECU 4000 will be described. The function of ECU 4000 described below may be realized by hardware or software.

ECU 4000 includes a first rotational speed detecting unit 4010, a first load factor calculating unit 4011, a second load factor calculating unit 4012, a third load factor calculating unit 4013, a first estimating unit 4014, a first processing unit 4021, a second processing unit 4022, a third processing unit 4023, a first ratio calculating unit 4031, a second ratio calculating unit 4032, a third ratio calculating unit 4033, a first control unit 4041, a second control unit 4042, a third control unit 4043, a second rotational speed detecting unit 4050, a second estimating unit 4060, a fourth ratio calculating unit 4062, a fourth control unit 4064, and a fifth control unit 4056.

The first rotational speed detecting unit 4010 detects current engine speed NE (state of operation) based on a signal transmitted from crank angle sensor 5000.

The first load factor calculating unit 4011, the second load factor calculating unit 4012, and the third load factor calculating unit 4013 calculate load factors KL (air filling efficiency in cylinder 1040) required of engine 1000 by the driver and the system mounted on the vehicle (such as automatic transmission, traction control system, stability control system, or auxiliary machinery) at the current engine speed NE. In the following, load factors KL calculated by the first load factor calculating unit 4011, the second load factor calculating unit 4012, and the third load factor calculating unit 4013 will also be referred to as load factor KL(1), load factor KL(2) and load factor KL(3), respectively.

In the present embodiment, load factor KL is used as a value representing the output of engine 1000. In place of load factor KL, an output torque or driving force may be used.

Figure 6:
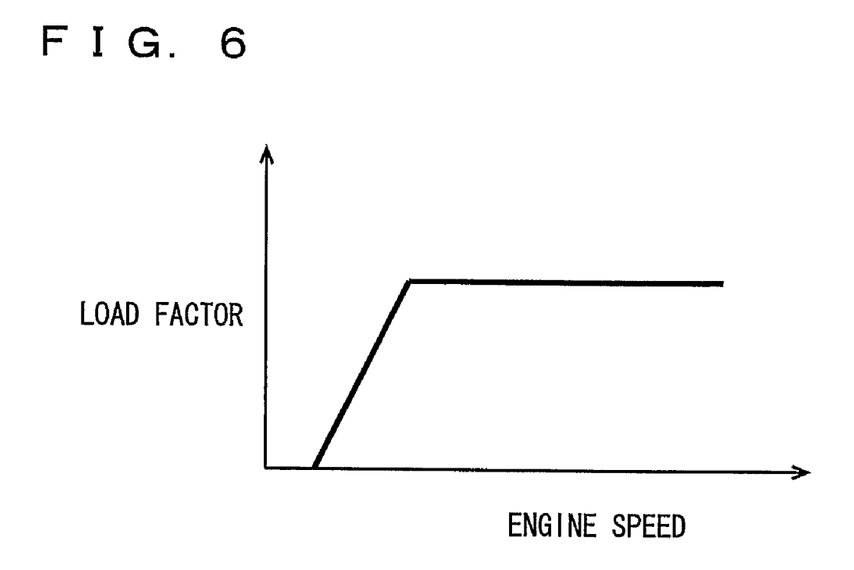
FIG. 6 is a (first) graph showing load factor KL.
Figure 7:
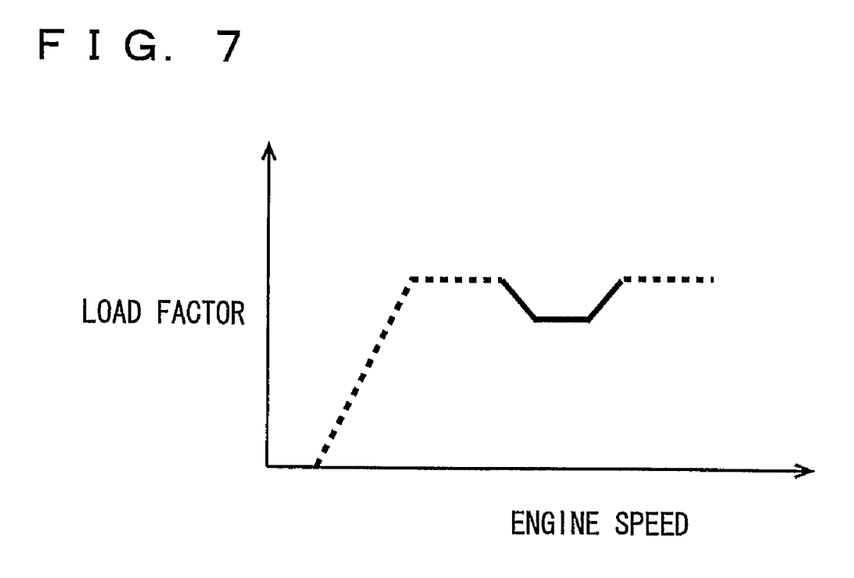
FIG. 7 is a (second) graph showing load factor KL.

Load factor KL(1) is calculated in accordance with a map that has engine speed NE, accelerator position or the like as a parameter, to have such a characteristic as shown in FIG. 6. Load factor KL(2) is calculated to have the characteristic that the load factor changes moderately, as shown by the solid line in FIG. 7. Load factor KL(3) is calculated to have the characteristic that the load factor changes steeply, as shown by the solid line in FIG. 8.

The required load factor eventually required of engine 1000, that is, the target output value of engine 1000 is set as a result of a number of processes using load factors KL(1), KL(2) and KL(3).

Figure 9:
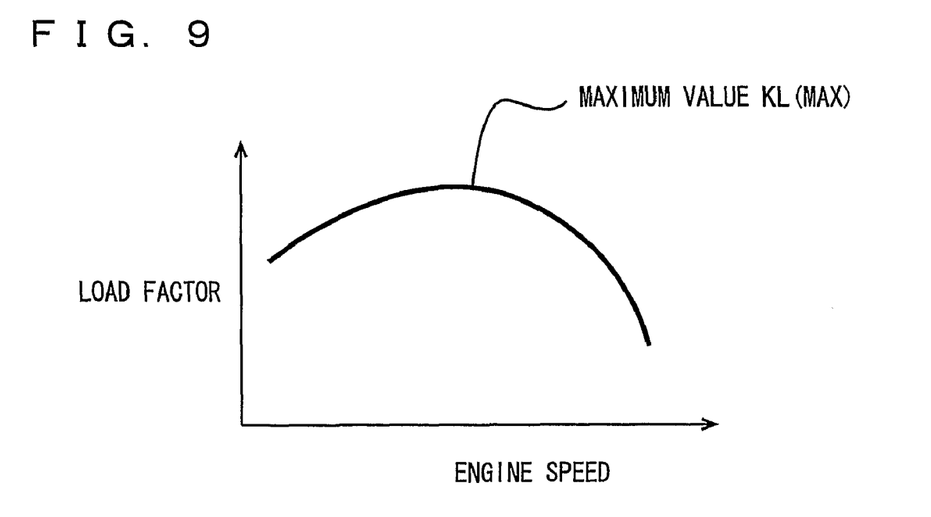
FIG. 9 shows the maximum value KL (MAX) of load factor KL.

The first estimating unit 4014 estimates the maximum value KL(MAX) of load factor KL at the present engine speed NE (state of operation). FIG. 9 shows an example of the maximum value KL(MAX). The maximum value KL(MAX) is calculated in advance through an experiment or simulation, and stored in ROM 4002.

The first processing unit 4021 processes the required load factor, using load factor KL(1). It is noted that at first processing unit 4021, load factor KL(1) is directly set as the required load factor.

Figure 10:
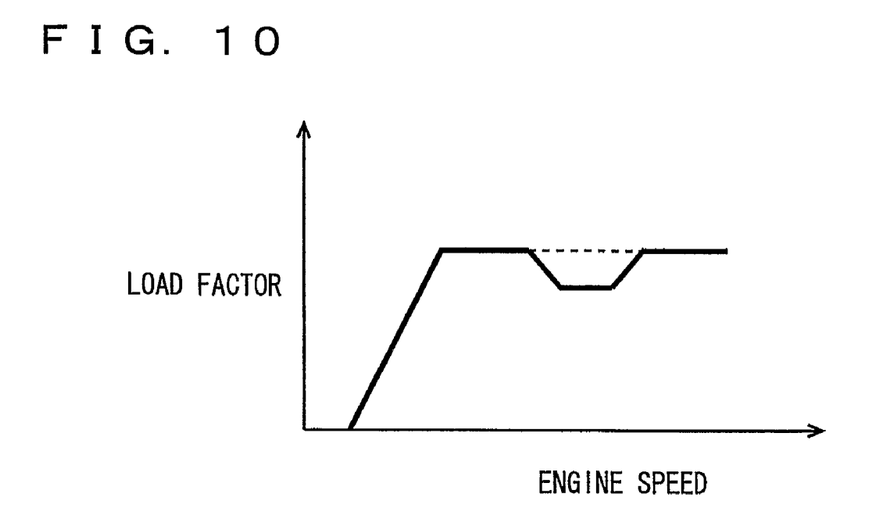
FIG. 10 is a (first) graph showing required load factor after processing.

The second processing unit 4022 processes the required load factor, using load factor KL(2). At the second processing unit 4022, load factor KL(2) is subtracted from or added to the required load factor processed (set) at the first processing unit 4021, whereby the required load factor is processed. Specifically, at the second processing unit 4021, the required load factor, which is obtained by correcting the required load factor set by the first processing unit 4021, is set. By the processing of required load factor at the second processing unit 4022, the required load factor such as shown by the solid line in FIG. 10 results.

Figure 11:
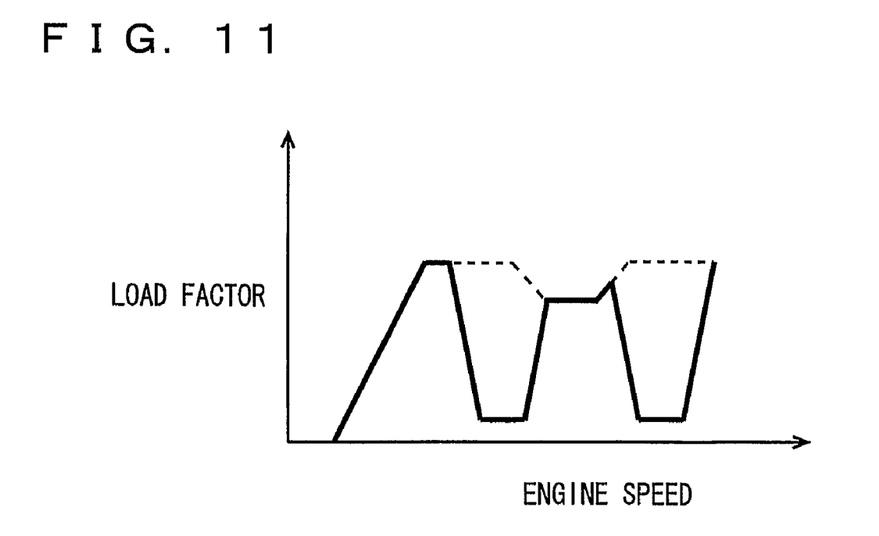
FIG. 11 is a (second) graph showing required load factor after processing.

The third processing unit 4023 processes the required load factor, using load factor KL(3). At the third processing unit 4023, load factor KL(3) is subtracted from or added to the required load factor processed (set) at the second processing unit 4022, whereby the required load factor is processed. Specifically, at the third processing unit 4023, the required load factor, which is obtained by correcting the required load factor set by the second processing unit 4022, is set. By the processing of required load factor at the third processing unit 4023, the required load factor such as shown by the solid line in FIG. 11 results.

The first ratio calculating unit 4031 calculates the ratio between the maximum value KL(MAX) and the required load factor processed at the first processing unit 4021. In the following, the ratio between the maximum value KL(MAX) and the required load factor processed at the first processing unit 4021 will also be referred to as Ratio (1). By dividing the required load factor by the maximum value KL(MAX), Ratio (1) is calculated.

The second ratio calculating unit 4032 calculates the ratio between the maximum value KL(MAX) and the required load factor processed at the second processing unit 4022. In the following, the ratio between the maximum value KL(MAX) and the required load factor processed at the second processing unit 4022 will also be referred to as Ratio (2). By dividing the required load factor by the maximum value KL(MAX), Ratio (2) is calculated.

The third ratio calculating unit 4033 calculates the ratio between the maximum value KL(MAX) and the required load factor processed at the third processing unit 4023. In the following, the ratio between the maximum value KL(MAX) and the required load factor processed at the third processing unit 4023 will also be referred to as Ratio (3). By dividing the required load factor by the maximum value KL(MAX), Ratio (3) is calculated.

The first control unit 4041 controls throttle valve 1030 such that it opens/closes in accordance with Ratio (1) between the maximum value KL(MAX) and the required load factor processed at the first processing unit 4021. For instance, the larger the Ratio (1), the throttle opening position is regulated to be larger.

The second control unit 4042 controls swirl control valve 1200 such that it opens/closes in accordance with Ratio (1) between the maximum value KL(MAX) and the required load factor processed at the first processing unit 4021. For instance, swirl control valve 1200 is controlled such that it opens when Ratio (1) is larger than a threshold value, and that swirl control valve 1200 closes when Ratio (1) is smaller than the threshold value.

The third control unit 4043 controls ignition plug 1060 such that ignition timing is changed in accordance with between the maximum value KL(MAX) and the required load factor processed at the third processing unit 4023. For instance, ignition plug 1060 is controlled such that it retards the ignition timing when Ratio (3) is smaller than a threshold value, and that ignition plug 1060 retards the ignition timing to be later when Ratio (3) becomes smaller.

The second rotational speed detecting unit 4050 detects the engine speed NE after throttle valve 1030, swirl control valve 1200 and ignition plug 1060 are regulated to realize the eventually obtained required load factor, based on the signal transmitted from crank angle sensor 5000. The engine speed NE may be estimated.

The second estimating unit 4060 estimates the maximum value KL(MAX) of load factor KL, at the engine speed NE after throttle valve 1030, swirl control valve 1200 and ignition plug 1060 are regulated to realize the eventually obtained required load factor.

The fourth ratio calculating unit 4062 calculates the ratio between the maximum value KL(MAX) obtained by the second estimating unit 4060 and the eventually obtained required load factor. In the following, the ratio calculated by the fourth ratio calculating unit 4062 will also be referred to as Ratio (4). By dividing the required load factor by the maximum value KL(MAX), Ratio (4) is calculated.

The fourth control unit 4064 controls intake valve 1100 such that its phase is changed in accordance with Ratio (4). Specifically, intake VVT mechanism 2000 is regulated to change the phase in accordance with Ratio (4). For instance, the phase is determined in accordance with a map using Ratio (4) as a parameter. The phase of exhaust valve 1110 may be changed in accordance with Ratio (4).

The fifth control unit 4066 controls ACIS 1300 such that the length of intake manifold 1032 is changed in accordance with Ratio (4). Specifically, ACIS valve 1302 is controlled such that is opens and closes in accordance with Ratio (4). For instance, by the control, ACIS valve 1302 closes when Ratio (4) is larger than a threshold value, and ACIS valve 1302 opens when Ratio (4) is smaller than the threshold value.

Figure 12:
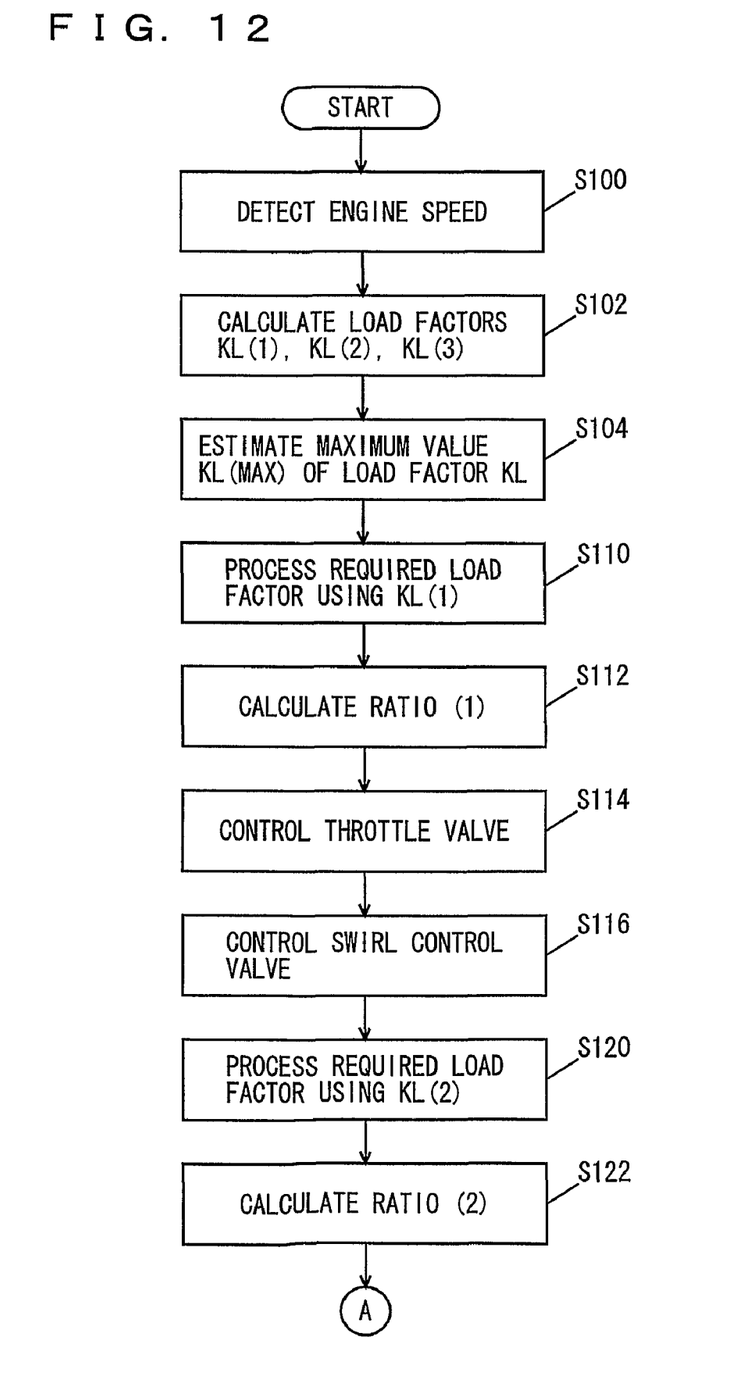
FIG. 12 is a (first) flowchart representing a control structure of a program executed by the ECU.
Figure 13:
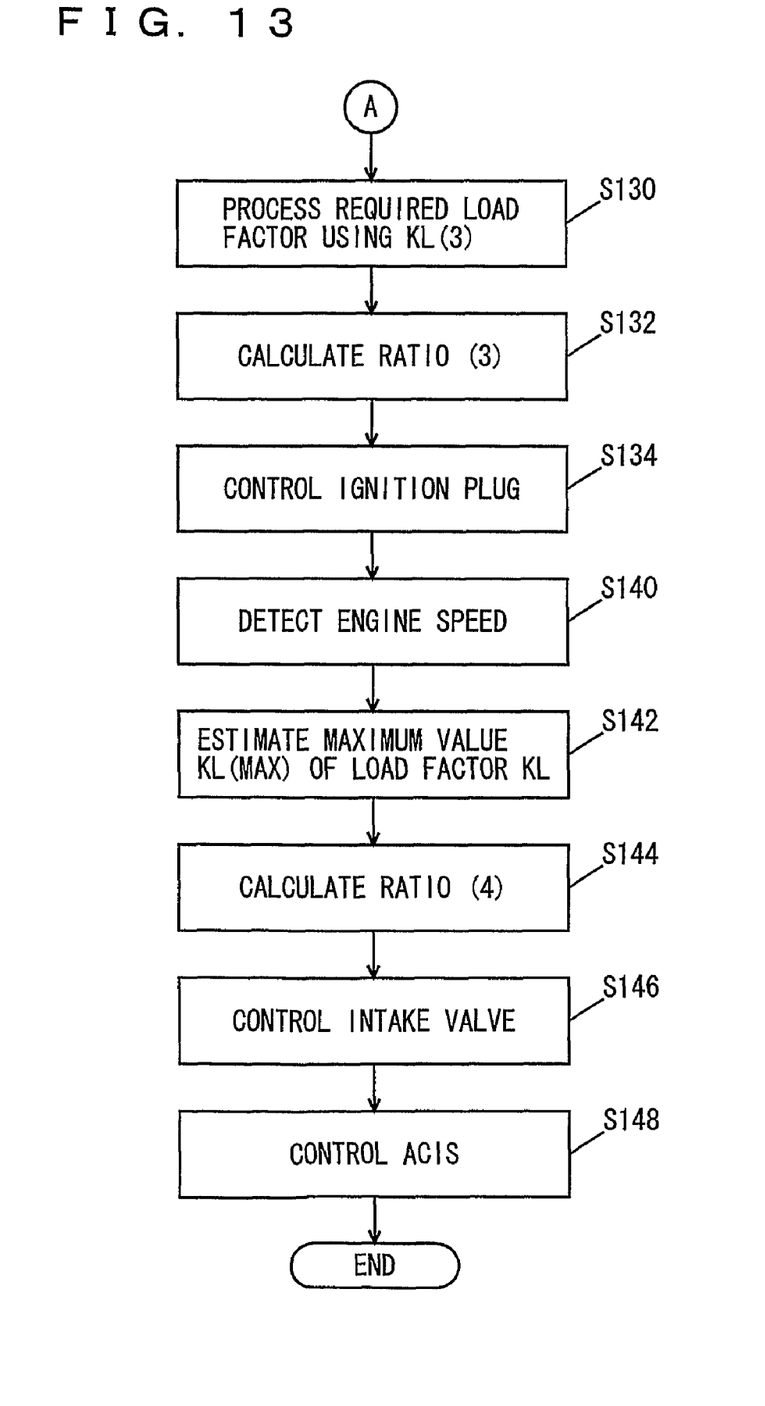
FIG. 13 is a (second) flowchart representing the control structure of the program executed by the ECU.

Referring to FIGS. 12 and 13, the control structure of the program executed by ECU 4000 will be described. The program described below is repeatedly executed in a predetermined period.

At step (hereinafter simply denoted by "S") 100, ECU 4000 detects the current engine speed NE (state of operation), based on a signal transmitted from crank angle sensor 5000.

At S102, ECU 4000 calculates load factors KL(1), KL(2) and KL(3) required of engine 1000 by the driver and the system mounted on the vehicle.

At S104, ECU 4000 estimates the maximum value KL(MAX) of load factor KL at the current engine speed NE.

At S110, ECU 4000 processes the required load factor, using load factor KL(1). At S112, ECU 4000 calculates Ratio (1) between the maximum value KL(MAX) and the required load factor processed by using load factor KL(1).

At S114, ECU 4000 controls throttle valve 1030 such that the valve opens/closes in accordance with Ratio (1) between the maximum value KL(MAX) and the required load factor processed by using load factor KL(1).

At S116, ECU 4000 controls swirl control valve 1200 such that the valve opens/closes in accordance with Ratio (1) between the maximum value KL(MAX) and the required load factor processed by using load factor KL(1).

At S120, ECU 4000 processes the required load factor, using load factor KL(2). At S122, ECU 4000 calculates Ratio (2) between the maximum value KL(MAX) and the required load factor processed by using load factor KL(2).

At S130, ECU 4000 processes the required load factor, using load factor KL(3). At S132, ECU 4000 calculates Ratio (3) between the maximum value KL(MAX) and the required load factor processed by using load factor KL(3).

At S134, ECU 4000 controls ignition plug 1060 such that the ignition timing is changed in accordance with Ratio (3) between the maximum value KL(MAX) and the required load factor processed by using load factor KL(3).

At S140, ECU 4000 detects the engine speed NE after throttle valve 1030, swirl control valve 1200 and ignition plug 1060 are regulated to realize the eventually obtained required load factor, based on the signal transmitted from crank angle sensor 5000.

At S142, ECU 4000 estimates the maximum value KL(MAX) of load factor KL at the engine speed NE after throttle valve 1030, swirl control valve 1200 and ignition plug 1060 are regulated to realize the eventually obtained required load factor.

At S144, ECU 4000 calculates Ratio (4) between the maximum value KL(MAX) estimated at S142 and the eventually obtained required load factor. At S146, ECU 4000 controls intake valve 1100 such that its phase is changed in accordance with Ratio (4). At S148, ECU 4000 controls ACIS 1300 such that the length of intake manifold 1032 is changed in accordance with Ratio (4).

The operation of ECU 4000 as the controller in accordance with the present embodiment, based on the structure and the flowchart above, will be described.

While engine 1000 is in operation, current engine speed NE is detected (S100). Load factors KL(1), KL(2) and KL(3) required of engine 1000 by the driver and the system mounted on the vehicle are calculated (S102). Further, the maximum value KL(MAX) of load factor KL at the current engine speed NE is estimated (S104).

Using the calculated load factor KL(1), the required load factor is processed (S110). Ratio (1) between the maximum value KL(MAX) and the required load factor processed by using load factor KL(1) is calculated (S112).

As shown in FIG. 6 described above, frequency of variation of load factor KL(1) is low. Therefore, load factor KL(1) can be regarded as the load factor KL that should constantly be realized by engine 1000. It is preferred that load factor KL(1) as such is realized by the control of throttle valve 1030 and swirl control valve 1200.

Therefore, throttle valve 1030 is controlled such that the valve opens/closes in accordance with Ratio (1) (S114). Further, swirl control valve 1200 is controlled such that the valve opens/closes in accordance with Ratio (1) (S116).

The required load factor is further processed using load factor KL(2) (S120). Ratio (2) between the maximum value KL(MAX) and the required load factor processed by using load factor KL(2) is calculated (S122).

Thereafter, the required load factor is further processed using load factor KL(3) (S130). Ratio (3) between the maximum value KL(MAX) and the required load factor processed by using load factor KL(3) is calculated (S132).

Figure 8:
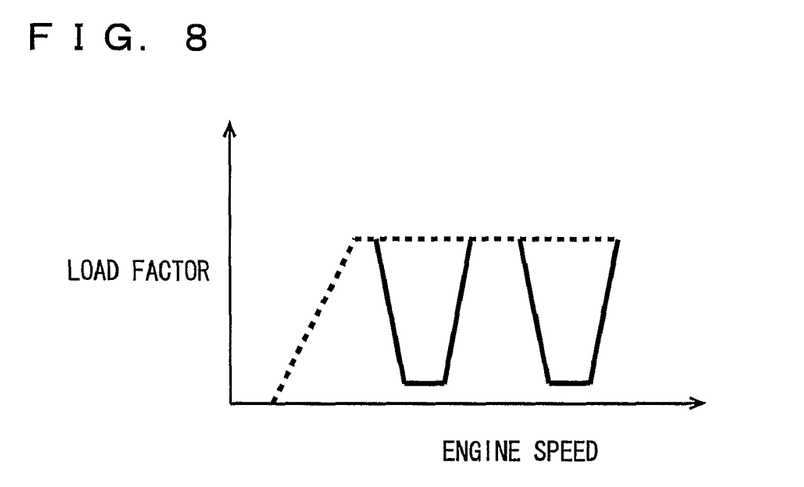
FIG. 8 is a (third) graph showing load factor KL.

As shown in FIG. 8 described above, load factor KL(3) changes quickly. Therefore, load factor KL(3) can be regarded as load factor KL that should be temporarily realized by engine 1000. It is preferred that load factor KL(3) as such is realized by changing the ignition timing. Therefore, ignition plug 1060 is controlled such that the ignition timing is changed in accordance with Ratio (3) (S134).

By controlling the adjusting mechanism such as throttle valve 1030 that adjusts the output of engine 1000 using the required load factor obtained in the course of processing, it become possible to operate the adjusting mechanism suitable for the characteristic of required load factor KL. Therefore, the required load factor KL can be realized with higher accuracy.

Further, engine speed NE after throttle valve 1030, swirl control valve 1200 and ignition plug 1060 are regulated to realize the eventually obtained required load factor is detected (S140). Further, the maximum value KL(MAX) of load factor KL at the engine speed NE after throttle valve 1030, swirl control valve 1200 and ignition plug 1060 are regulated to realize the eventually obtained required load factor is estimated (S142).

Then, Ratio (4) between the estimated maximum value KL(MAX) and the eventually obtained required load factor is calculated (S144). Intake valve 1100 is controlled such that its phase is changed in accordance with Ratio (4) (S146). ACIS 1300 is controlled such that the length of intake manifold 1032 is changed in accordance with Ratio (4) (S148).

Figure 14:
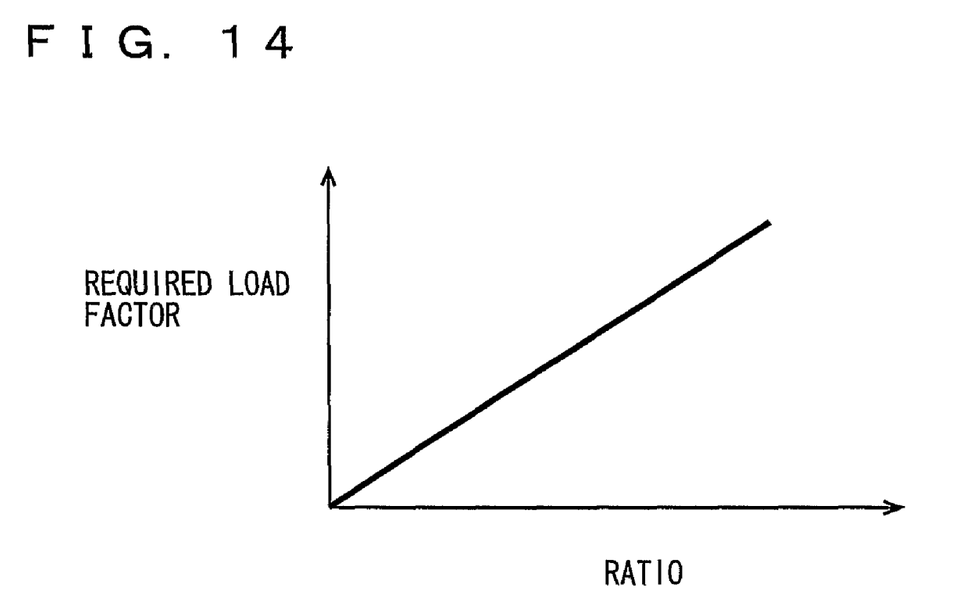
FIG. 14 shows a relation between the required load factor and the ratio.

The maximum value KL(MAX) of load factor KL is uniquely determined with respect to engine speed NE. Therefore, the ratio between the maximum value KL(MAX) and the required load factor is in proportion to the required load factor, as shown in FIG. 14. Therefore, if the required load factor varies by a small mount, the ratio between the maximum value KL(MAX) and the required load factor varies by a small amount. On the contrary, if the required load factor varies by a large mount, the ratio between the maximum value KL(MAX) and the required load factor varies by a large amount. Throttle valve 1030 or the like that adjusts the output of engine 1000 is controlled in accordance with the ratio having such a characteristic. Therefore, operation of throttle valve 1030 and the like can be stabilized. As a result, the output of internal combustion engine can be controlled with higher accuracy.

As described above, in the controller in accordance with the present embodiment, the throttle valve and the like adjusting the engine output are controlled in accordance with the ratio between the maximum value KL(MAX) of engine load factor and the load factor required of the engine. Therefore, operation of throttle valve and the like can be stabilized. As a result, the output of internal combustion engine can be controlled with higher accuracy.

When the ratio between the maximum value KL(MAX) of load factor and the required load factor is calculated, decrease of load (torque) derived from a supercharger, fuel cut, cylinder deactivation or ignition timing may be taken into consideration.

Further, if the load factor KL increases or decreases as shown in FIG. 8 above, the ratio between the maximum value KL(MAX) of load factor KL and the required load factor may be calculated using only one of the increasing load factor and the decreasing load factor.

Further, it is also possible to determine whether the adjusting mechanism adjusting the output of engine 1000 is to be turned on or not, using one of the plurality of ratios calculated every time the required load factor is processed, and to determine whether it is to be turned off or not using another ratio. For instance, whether the swirl control valve 1200 is to be closed or not may be determined using any one of the plurality of ratios, and whether it is to be opened or not may be determined using another one of the ratios.

Further, the adjusting mechanism adjusting the output of engine 1000 may be controlled in accordance with a value obtained by adding or subtracting the plurality of ratios to or from each other.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

The invention claimed is:

1. A controller for an internal combustion engine, comprising:
   a throttle valve and an ignition plug that adjust an output of the internal combustion engine;
   calculating means including means for calculating a first target value of the output of said internal combustion engine and means for calculating a second target value that changes more quickly than said first target value by correcting said first target value;
   means for detecting an output shaft speed of said internal combustion engine; and
   controlling means including means for controlling said throttle valve such that a throttle opening position is regulated to be larger as a ratio between maximum output of said internal combustion engine at the detected output shaft speed and said first target value is larger, and means for controlling said ignition plug such that an ignition timing is retarded when a ratio between said maximum output and said second target value is smaller than a threshold value.

2. A controller for an internal combustion engine, comprising:
   a throttle valve that adjusts an output of the internal combustion engine and an adjustment mechanism that adjusts the output of said internal combustion engine by changing a length of an intake manifold of said internal combustion engine;
   calculating means including means for calculating a first target value of the output of said internal combustion engine and means for calculating a second target value that changes more quickly than said first target value by correcting said first target value;
   means for detecting an output shaft speed of said internal combustion engine; and controlling means including means for controlling said throttle valve such that a throttle opening position is regulated to be larger as a ratio between maximum output of said internal combustion engine at the detected output shaft speed and said first target value is larger, and means for controlling said adjustment mechanism such that said intake manifold is increased in length when a ratio between maximum output, at an output shaft speed of said internal combustion engine after said throttle valve is controlled such that the throttle opening position is regulated to be larger as said ratio between maximum output of said internal combustion engine at the detected output shaft speed and said first target value is larger, of said internal combustion engine and said second target value is larger than a threshold value.

3. A controller for an internal combustion engine, comprising:
 a throttle valve, and at least one of an intake valve and an exhaust valve that adjust an output of the internal combustion engine;
 calculating means including means for calculating a first target value of the output of said internal combustion engine and means for calculating a second target value that changes more quickly than said first target value by correcting said first target value;
 means for detecting an output shaft speed of said internal combustion engine; and
 controlling means including means for controlling said throttle valve such that a throttle opening position is regulated to be larger as a ratio between maximum output of said internal combustion engine at the detected output shaft speed and said first target value is larger, and means for controlling at least one of said intake valve and said exhaust valve such that a phase is determined in accordance with a ratio between maximum output, at an output shaft speed of said internal combustion engine after said throttle valve is controlled such that the throttle opening position is regulated to be larger as said ratio between maximum output of said internal combustion engine at the detected output shaft speed and said first target value is larger, of said internal combustion engine and said second target value.

4. A controller for an internal combustion engine, comprising:
 a swirl control valve and an ignition plug that adjust an output of the internal combustion engine;
 calculating means including means for calculating a first target value of the output of said internal combustion engine and means for calculating a second target value that changes more quickly than said first target value by correcting said first target value;
 means for detecting an output shaft speed of said internal combustion engine; and
 controlling means including means for controlling said swirl control valve such that said swirl control valve is opened when a ratio between maximum output of said internal combustion engine at the detected output shaft speed and said first target value is larger than a first threshold value and such that said swirl control valve is closed when said ratio between the maximum output and said first target value is smaller than the first threshold value, and means for controlling said ignition plug such that an ignition timing is retarded when a ratio between said maximum output and said second target value is smaller than a second threshold value.

5. A controller for an internal combustion engine, comprising:
 a swirl control valve that adjusts an output of the internal combustion engine and an adjustment mechanism that adjusts the output of said internal combustion engine by changing a length of an intake manifold of said internal combustion engine;
 calculating means including means for calculating a first target value of the output of said internal combustion engine and means for calculating a second target value that changes more quickly than said first target value by correcting said first target value;
 means for detecting an output shaft speed of said internal combustion engine; and
 controlling means including means for controlling said swirl control valve such that said swirl control valve is opened when a ratio between maximum output of said internal combustion engine at the detected output shaft speed and said first target value is larger than a first threshold value and such that said swirl control valve is closed when said ratio between the maximum output and said first target value is smaller than the first threshold value, and means for controlling said adjustment mechanism such that said intake manifold is increased in length when a ratio between maximum output, at an output shaft speed of said internal combustion engine after said swirl control valve is controlled such that said swirl control valve is opened when said ratio between maximum output of said internal combustion engine at the detected output shaft speed and said first target value is larger than the first threshold value and such that said swirl control valve is closed when said ratio between the maximum output and said first target value is smaller than the first threshold value, of said internal combustion engine and said second target value is larger than a second threshold value.

6. A controller for an internal combustion engine, comprising:
 a swirl control valve, and at least one of an intake valve and an exhaust valve that adjust an output of the internal combustion engine;
 calculating means including means for calculating a first target value of the output of said internal combustion engine and means for calculating a second target value that changes more quickly than said first target value by correcting said first target value;
 means for detecting an output shaft speed of said internal combustion engine; and
 controlling means including means for controlling said swirl control valve such that said swirl control valve is opened when a ratio between maximum output of said internal combustion engine at the detected output shaft speed and said first target value is larger than a first threshold value and such that said swirl control valve is closed when said ratio between the maximum output and said first target value is smaller than the first threshold value, and means for controlling at least one of said intake valve and said exhaust valve such that a phase is determined in accordance with a ratio between the maximum output, at an output shaft speed of said internal combustion engine after said swirl control valve is controlled such that said swirl control valve is opened when said ratio between maximum output of said internal combustion engine at the detected output shaft speed and said first target value is larger than the first threshold value and such that said swirl control valve is closed when said ratio between the maximum output and said first target value is smaller than the first threshold value, of said internal combustion engine and said second target value.

* * * * *